E. H. KERNS.
CHAIN OF THE FOLDED METAL LINK TYPE.
APPLICATION FILED OCT. 6, 1913.
1,126,228.
Patented Jan. 26, 1915.
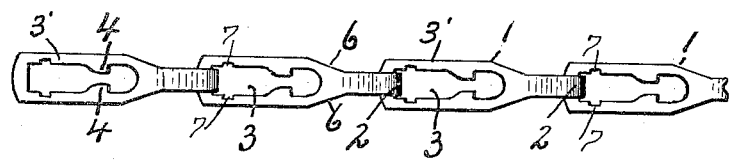
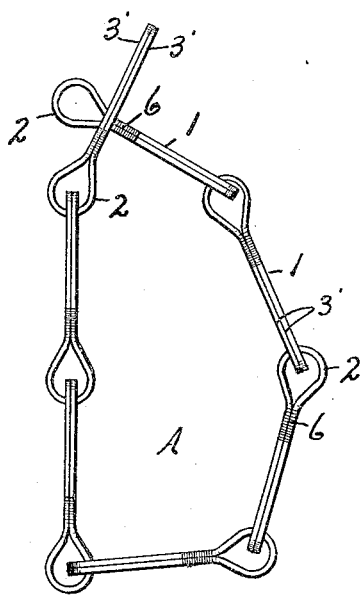
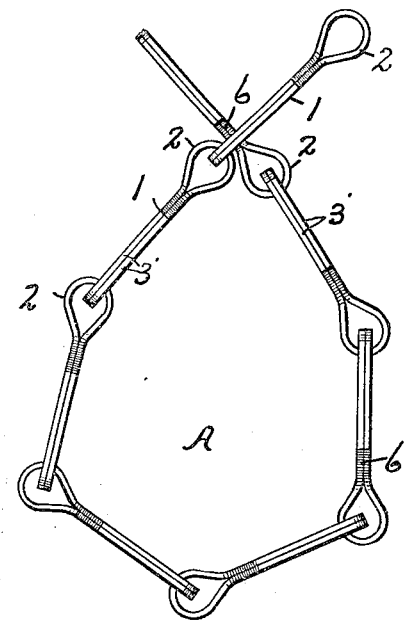
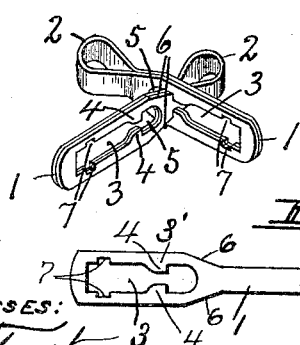
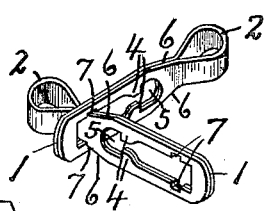
INVENTOR
E. H. Kerns
WITNESSES:
BY Howard P. Denton
ATTORNEY

UNITED STATES PATENT OFFICE.

EVRAND H. KERNS, OF WEEDSPORT, NEW YORK.

CHAIN OF THE FOLDED METAL-LINK TYPE.

1,126,228.  Specification of Letters Patent.  Patented Jan. 26, 1915.

Application filed October 6, 1913. Serial No. 793,720.

*To all whom it may concern:*

Be it known that I, EVRAND H. KERNS, of Weedsport, in the county of Cayuga, in the State of New York, have invented new and useful Improvements in Chains of the Folded Metal-Link Type, of which the following, taken in connection with the accompanying drawings, is a full, clear, and exact description.

This invention relates to certain improvements in chains of the folded metal-link type having elongated slots for receiving the folds or loops of adjacent links whereby when the chain is stretched out in a straight line, the links will all lie in substantially the same flat plane, thus permitting it to be wrapped flatwise around pipes, drums, packages and the like for use as a link belt, binder for barrels, boxes and other packages but more particularly as a pipe hanger.

The main object is to provide each link with a special form of slot contracted near one end and slightly enlarged near its opposite end for interlocking engagement with the portion of any one of the other links near the junction of the loop with the main body, thus permitting the link at either end of the chain to be securely attached to any other link without the aid of extra fastening means.

Another object is to prevent relative endwise movement of the interlocked links when adjusted for use around a pipe or other object.

Additional objects and uses will be brought out in the following description.

Figure 1 is a face view of a portion of a chain embodying the various features of my invention. Figs. 2 and 3 are edge views of the same chain showing the different methods by which the links may interlock one with the other after drawing the chain around a pipe or other object. Figs. 4 and 5 are perspective views of the interlocking links shown respectively in Figs. 2 and 3. Fig. 6 is a face view of one of the link-blanks before being folded.

As illustrated, this chain comprises any number of links —1— each having at one end a loop —2— while its opposite end is provided with a lengthwise slot —3— corresponding in width approximately to the width of the loop and through which the loop of another similar link is adapted to be inserted to establish interlocking connection between the adjacent links.

Each link preferably consists of a strip of sheet metal of substantially twice the length of the link as shown in Fig. 6, the intermediate portion of the strip being reduced to form a relatively narrow neck connecting the ends —3'— which are relatively wider and provided with the slots —3— previously mentioned, the reduced central portion of the strip being bent in the form of a loop or eye —2— whereby the opposite wider ends —3'— are brought together flatwise face to face with their apertures —3— in registration.

The length of the slot —3— is equal to or slightly greater than the width of the adjacent portions of the link so as to permit either end of the link-blank or strip to be inserted edgewise therethrough until the reduced portion is registered therewith whereupon the link may be returned a quarter turn to a flatwise position relatively to the adjacent link for interlocking the loop of such link with the slotted end of the adjacent link, this operation being continued throughout the length of the chain.

The width of the greater portion of the slot —3— is substantially equal to or slightly greater than that of the reduced portion of the link which forms a loop —2— to allow the loop of another link to be passed edgewise therethrough, but in order to carry out the specific objects of my invention, the wider portion of the link near its junction with the loop —2— is provided with inwardly projecting shoulders or abutments —4— at opposite sides of the slot —3— but spaced a distance apart equal to or slightly greater than the thickness of the link, but still of less width than the width of the main portion of the slot or loop —2— to allow another link to be moved edgewise between and from one end to the other end of the shoulders. The formation of the opposed shoulders —4— between the ends of the slot —3— enables either end of one of the end links of a chain to be inserted through the slot —3— of any one of the other links until its reduced portion is registered with the shoulders —4— whereupon such end link may be turned a quarter turn or edgewise relatively to the passage —5— and moved edgewise therethrough leaving the loop of the end link at one side and its wider portion at the opposite side of the link with which it is interlocked.

The opposite edges of the portions of each link near the junction of the loop —2— with the main body are inclined forming exterior beveled shoulders —6— which not only serve to stiffen this portion of the link but allows either end link of the chain to be conveniently interlocked with any of the other links around a pipe or other object and for this purpose, the opposite sides of the end of the link opposite the loop —2— are provided with notches or recesses —7— forming an enlargement of the corresponding end of the slot —3— near the outer end thereof although the width of this enlarged portion of the slot is still less than that of the main body of the link in which the recesses are formed so that when the slotted end of an end link is inserted edgewise through the slot of another link, the tapering shoulders —6— may be registered with and drawn tightly into the recesses —7— to lock said end link against lateral movement in the slot of the adjacent link, the notches or recesses —7— being located a sufficient distance from the outer end of the slot —6— to permit the attachment and free movement of the loop of another link to the end of the first named link as shown more clearly in Fig. 3.

The distance between the shoulders —4— and inner end of the slot —3— is less than the diameter of the loop to prevent the latter from being withdrawn therefrom when its link is interlocked with another link as shown in Figs. 2 and 4. For example, assuming that in Fig. 2 the link which is inserted through the slot of another link is an end link and that said other link is part of the main body of the chain, then if the looped end of the end link is the free end of such link, it may be inserted edgewise through the portion of the slot in the body link at the outside of the shoulders —4— and then turned a quarter turn and moved edgewise through the contracted portion of the slot between said shoulders until its reduced portion is brought into the portion of the slot at the inner side of the shoulders whereupon it may be returned a quarter turn to interlock it with the body link against endwise or lateral displacement, thus forming a loop as —A— of a portion of the chain which may be passed around a pipe or other object to support or bind the same while the main body of the link may be cut off any desired length and nailed or otherwise secured to any other available support as a joist in case the device is used as a hanger for pipes or other objects. On the other hand, if the loop —2— is attached to the main body of the chain and the slotted end is free, this slotted end may be passed flatwise through the slot of any of the other body links and then moved edgewise through the contracted portion of the slot between the shoulders —4— until its reduced portion is registered with the inner end of the body link whereupon it may be returned a quarter turn to a plane at right angles to that of the body link and thus interlocked therewith.

In Figs. 3 and 5, assuming that the link which is inserted through the slot of the other link is an end link and that its loop is attached to the main body of the chain, then the opposite end may be inserted flatwise through the slot of the body link until its reduced portion adjacent the loop is registered with opposite sides of the body link whereupon it may be returned a quarter turn and drawn endwise in the direction of its loop until its tapered sides —6— are brought into interlocking engagement with the recesses —7— of said body link, thus interlocking the two links together against relative movement.

What I claim is:

1. A chain composed of folded metal-links, each link having its folded end constituting a loop of less width than its body portion, said body portion having a lengthwise slot, the greater portion of which is slightly wider than the loop to allow the latter to be inserted therethrough, the slot being contracted between its ends to form inwardly projecting shoulders a sufficient distance from one end of the slot to permit the insertion of the loop of another link through the slot between such end and the shoulders.

2. A chain composed of folded metal-links, each link having its folded end constituting a loop of less width than its body portion, said body portion having a lengthwise slot, the greater portion of which is of slightly greater width than the corresponding width of the loop to permit the loop of another link to be inserted endwise therethrough, said slot being enlarged a short distance from one end to form notches of slightly greater length than the thickness of the body portion of the link, the edges of said body portion adjacent the loop being beveled longitudinally, whereby the beveled edges of another link may be wedged into said notches after inserting its loop endwise through the slot.

3. A chain composed of folded metal-links, each link having its folded end constituting a loop of less width than its body portion, said body portion having a lengthwise slot, the greater portion of which is slightly wider than the loop to allow the loop of another link to be inserted therethrough, said slot being contracted a short distance from one end to form inwardly projecting shoulders, and enlarged a short distance from its opposite end to form notches.

In witness whereof I have hereunto set my hand this 1st day of October, 1913.

EVRAND H. KERNS.

Witnesses:
H. E. CHASE,
EVA E. GREENLEAF.